United States Patent
Suzuki et al.

[11] Patent Number: 5,757,681
[45] Date of Patent: May 26, 1998

[54] ELECTRONIC APPARATUS WITH AN INPUT PEN

[75] Inventors: Koji Suzuki, Tenri; Kazumasa Fujimura, Yamatokoriyama, both of Japan

[73] Assignee: Sharp Kabushiki Kaisha, Osaka, Japan

[21] Appl. No.: 662,117

[22] Filed: Jun. 12, 1996

[30] Foreign Application Priority Data

Jun. 14, 1995 [JP] Japan .................. 7-147388

[51] Int. Cl.$^6$ ........................................... G06F 1/16
[52] U.S. Cl. ................. 364/705.03; 364/708.1; 364/709.11; 361/686
[58] Field of Search ................. 364/705.03, 708.1, 364/709.01, 709.11; 361/679, 683, 686

[56] References Cited

U.S. PATENT DOCUMENTS

| | | |
|---|---|---|
| 5,555,157 | 9/1996 | Noller et al. .................. 361/683 |
| 5,644,516 | 7/1997 | Podwalny et al. .............. 364/708.1 |

FOREIGN PATENT DOCUMENTS 2-145437  12/1990  Japan .

*Primary Examiner*—Chuong Dinh Ngo
*Attorney, Agent, or Firm*—David G. Conlin; William J. Daley, Jr.

[57] ABSTRACT

An electronic apparatus with an input pen is provided with an apparatus main body wherein the input pen is housed, and a hard cover which is attached to the apparatus main body in a covering manner so as to be freely opened and closed. The apparatus main body is provided with a lock button that is pressed from outside toward inside, a pressing member that presses and urges the inside end of the housed input pen outwardly, an engaging member that engages the hard cover in its closed state, a cover holding member that releases the engagement where it is shifted, and a pen holding member that engages the input pen. Here, the lock button is connected to the pen holding member, and the cover holding member is placed with a space to the inside end face of the lock button so that, when the lock button has been shifted until there is no space left, it is pressed by the lock button. This arrangement makes it possible to carry out a sequence of operations, that is, the opening operation of the hard cover and the taking-out operation of the input pen, by merely performing a single combined operation of the input pen.

21 Claims, 15 Drawing Sheets

ELECTRONIC APPARATUS WITH AN INPUT PEN

FIELD OF THE INVENTION

The present invention relates to an electronic apparatus with an input pen, such as electronic notebooks and personal computers of notebook type, to which hand-written data can be inputted. In particular, the present invention concerns an electronic apparatus that is provided with an apparatus main body wherein the input pen is housed and supported and a hard cover that is attached to the apparatus main body in a covering manner so as to be freely opened and closed.

BACKGROUND OF THE INVENTION

Conventionally, among small-size electronic apparatuses such as electronic notebooks and personal computers of notebook type, electronic apparatuses with an input pen (hereinafter, referred to as electronic apparatuses) to which hand-written data can be inputted have been known. As schematically illustrated in FIGS. 17 and 18, the electronic apparatus has a display section 1 having a pressure-sensitive construction that is called a touch panel, and hand-written data is inputted by pressing the display section 1 with an input pen 2. In the electronic apparatus, a hard cover 4 for protecting an apparatus main body 3 is attached to the apparatus main body 3 so as to be freely opened and closed, and the display section 1 is placed on the surface of the hard cover 4 or the apparatus main body 3. Here, the hard cover 4 is designed so that it is opened by pressing a lock button 5, installed on one side of the apparatus main body 3 as a cover holding member for the cover, from outside toward inside.

In other words, the lock button 5 has an engaging member 6 that engages the hard cover 4 which has been closed, and the engagement between the engaging member 6 and the hard cover 4 is released when the engaging member 6 is shifted by the movement of the lock button 5 that has been pressed. Further, the input pen 2 is housed in the apparatus main body 3 with its top portion placed inward, and the input pen 2 is supported in the apparatus main body 3 by a pinch clip 7 that is installed at the base portion thereof. Additionally, a key board 8 is placed on the surface of the apparatus main body 3.

However, in the above-mentioned conventional arrangement, the lock button 5 has to be pressed in order to open the hard cover 4 of the electronic apparatus. Moreover, when the input pen 2 is used, it is necessary to draw and take out the input pen 2 after having released it from the fixed state by grabbing the pinch clip 7 with fingers. In this case, these operations can not be carried out at the same time, and have to be done in a separate manner; this has resulted in inconvenience in use. In accordance with research made by the applicants of the present invention, Japanese Laid-Open Utility Model Publication No. 145437/1990 (Jitsukaihei 2-145437) discloses the following arrangement, which is considered to be an prior art arrangement for making it easier to take out the input pen 2.

As schematically illustrated in FIG. 19, in the prior art arrangement, a plate spring 9 is provided so that an input pen 2, which is housed inside an apparatus main body (not shown), is pressed at its inside end and urged outward. In addition, a releasing button 10, which supports the input pen 2 by engaging an engaging-use recess 2a that is formed on the side face of the input pen 2 in the lengthwise direction, is installed in the apparatus main body. When the input pen 2 is taken out, the engagement between the engaging-use recess 2a and the releasing button 10 is released so that the input pen 2 is pushed out of the apparatus main body by the plate spring 9. However, the electronic apparatuses to which this prior art arrangement is applied do not have a hard cover 4. Therefore, even if this prior art arrangement, as it is, is applied to the conventional electronic apparatuses with the hard cover 4, it is not possible to eliminate the above-mentioned inconvenience, that is, the inconvenience of having to separately carry out the opening operation of the hard cover 4 and the taking-out operation of the input pen 2.

SUMMARY OF THE INVENTION

It is an objective of the present invention to provide an electronic apparatus with an input pen wherein: an apparatus main body, which houses and supports an input pen, and a hard cover, which is attached to the apparatus main body in a covering manner so as to be freely opened and closed, are provided; hand-written data is inputted by the input pen; and an opening operation of the hard cover and a taking-out operation of the input pen are carried out as a single operation.

In order to achieve the above-mentioned objective, the first electronic apparatus with an input pen of the present invention is provided with: an apparatus main body which houses and supports an input pen and a hard cover which is attached to the apparatus main body in a covering manner so as to be freely opened and closed. The apparatus main body has a lock button that is pressed from outside toward inside, a pen-holding member that engages the input pen which has been housed and that releases the engagement of the input pen when the lock button is shifted, a first pressing member for pressing the input pen at its inside end so as to urge it outward, an engaging member for engaging the hard cover that has been closed, and a cover holding member for releasing the engagement when the lock button is shifted.

With this arrangement, when the lock button is shifted, the engagement of the engaging member of the cover holding member is released and at the same time, the engagement between the housed input pen and the pen holding member is released. This allows the hard cover to be opened and also allows the input pen, which has been pressed and urged by the first pressing member, to be pushed out of the apparatus main body. Therefore, it becomes possible to carry out a sequence of operations, that is, the opening operation of the hard cover and the taking out operation of the input pen, by merely performing a single pressing operation of the lock button. Consequently, it is possible to improve usability, that is, convenience in use.

Further, in the above-mentioned arrangement, the pen holding member is preferably connected to the lock button and the cover holding member is preferably placed with a space to the inside end face of the lock button so that it is pressed by the lock button that has been shifted until there is no space left in between. With this arrangement, the engagement of the input pen, made by the pen holding member, is released when the pen holding member is shifted following the pressing operation of the lock button. Thus, the input pen, which has been released from the engagement, is pressed and urged by the pressing member, and allowed to be pushed out of the apparatus main body. Here, if the pressing operation of the lock button is continued, the engagement of the engaging member to the hard cover is released, following the movement of the cover holding member, thereby allowing the hard cover to be opened.

Alternatively, in the above-mentioned arrangement, the pen holding member is preferably placed with a space to the inside end face of the lock button, and is arranged to be pressed by the lock button that has been shifted until there is no space left in between. Here, the cover holding member is preferably connected to the lock button. With this arrangement, since the engagement of the engaging member to the hard cover is released following the movement of the lock button that has been pressed, it is possible to open the hard cover. Here, if the pressing operation of the lock button is continued, the engagement of the input pen, made by the pen holding member, is released following the movement of the pen holding member so that the input pen, which has been released from the engagement, is pressed and urged by the pressing member, and allowed to be pushed out of the apparatus main body.

Moreover, in order to achieve the above-mentioned objective, the second electronic apparatus of the present invention is provided with: an apparatus main body which houses an input pen in a freely attachable and removable manner and a hard cover which is attached to the apparatus main body in a covering manner so as to be freely opened and closed. The apparatus main body has a pen holding member that is shifted where engaging the housed input pen, and that releases the engagement when the input pen is drawn to a predetermined position, an engaging member for engaging the hard cover that has been closed, and a cover holding member that releases the engagement when the pen holding member is shifted.

With this arrangement, the engagement of the engaging member of the cover holding member is released when the input pen is drawn, and the hard cover is allowed to be opened. Therefore, it becomes possible to carry out a sequence of operations, that is, the opening operation of the hard cover and the taking out operation of the input pen, by merely performing a single drawing operation of the input pen. Thus, in addition to the effects obtained by the first electronic apparatus, since the input pen itself is utilized instead of the lock button, no lock button is required in the apparatus main body. This makes it possible to simplify the apparatus appearance. Further, such an arrangement makes it possible to eliminate the possibility that the hard cover may open inside a bag or other articles by an accidental pressing action onto the lock button.

For a fuller understanding of the nature and advantages of the invention, reference should be made to the ensuing detailed description taken in conjunction with the accompanying drawings.

DESCRIPTION OF THE EMBODIMENT

[Embodiment 1]

Referring to FIGS. 1 through 5, the following description will discuss one embodiment of the present invention.

Figure 1:
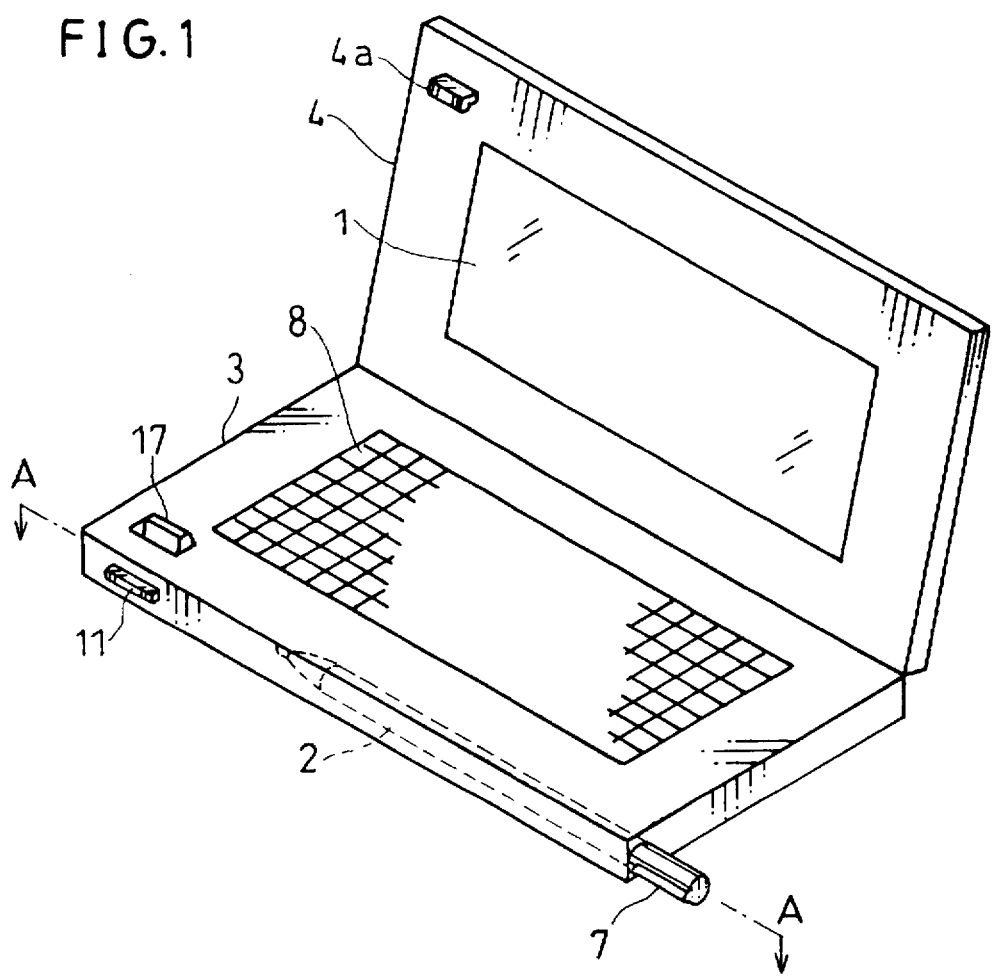
FIG. 1, which is a perspective view showing an appearance of an electronic apparatus of Embodiment 1 and Embodiment 2, indicates a state where a hard cover is opened.
Figure 2:
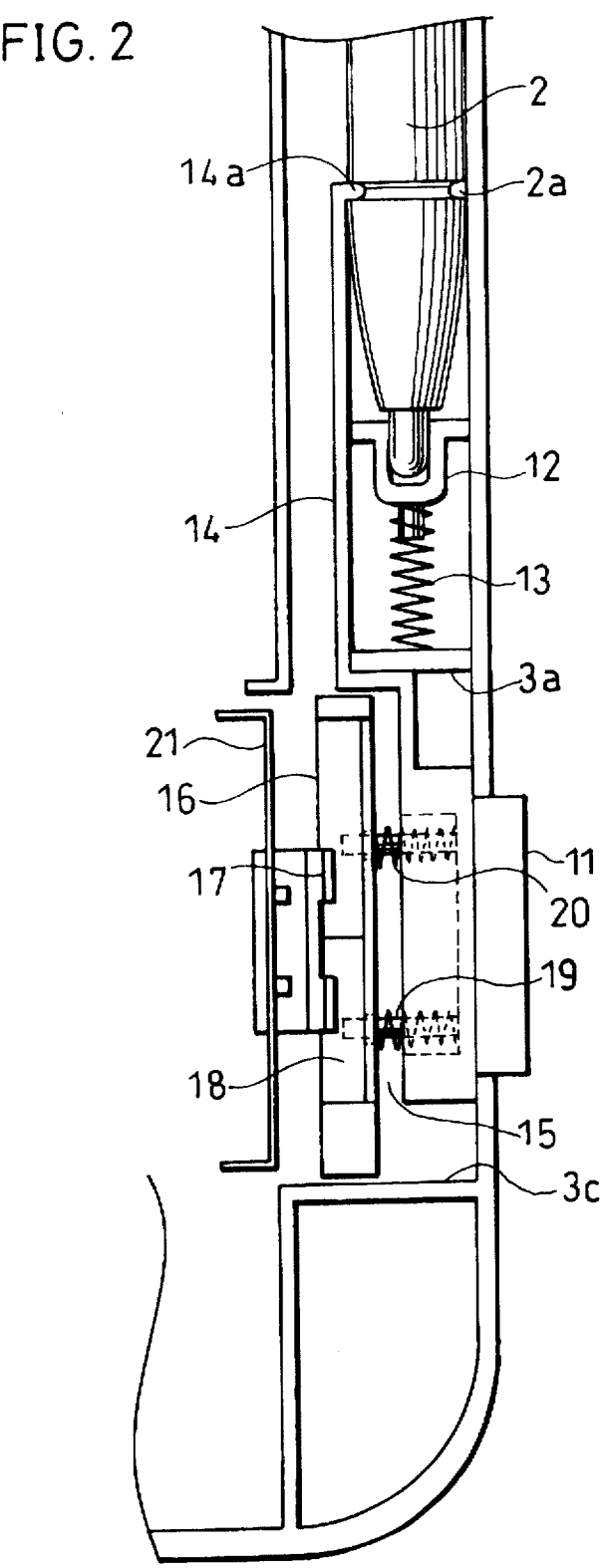
FIG. 2, which is a cross-sectional view taken by a plane along line A—A of FIG. 1, shows an essential structure of the electronic apparatus of Embodiment 1 in which the hard cover is closed.
Figure 3:
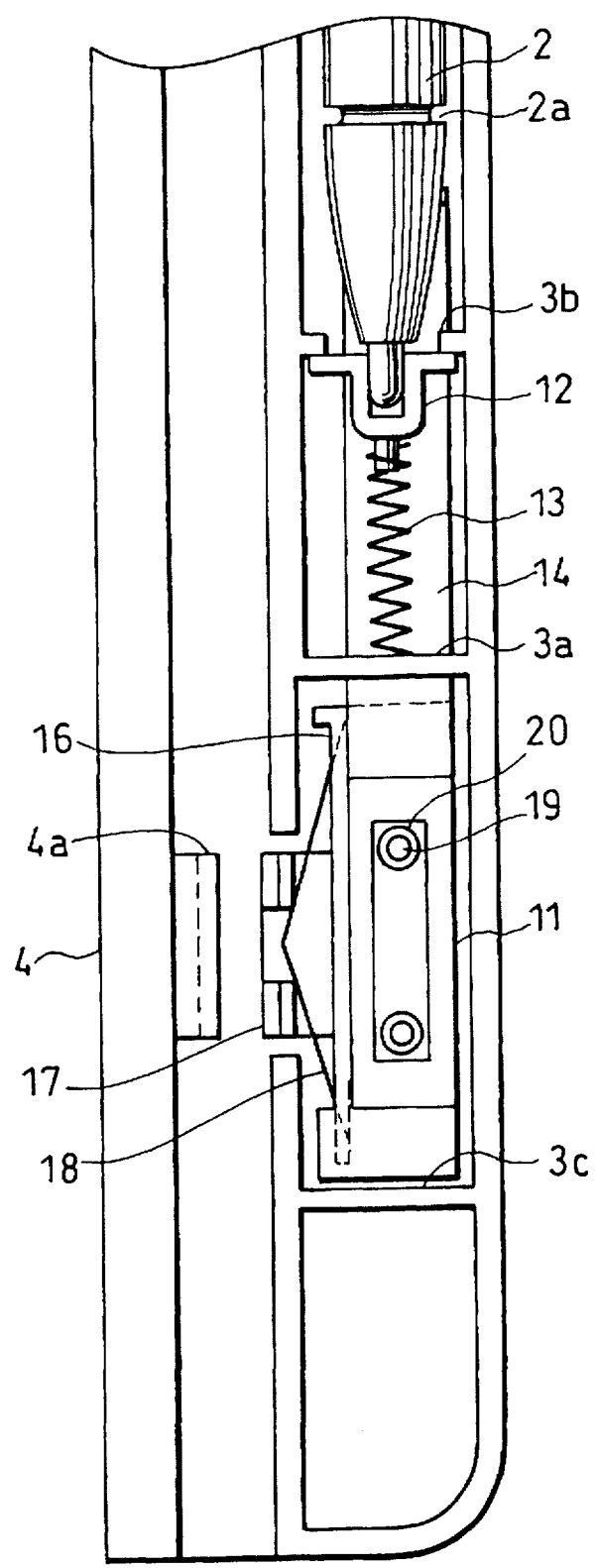
FIG. 3, which is a longitudinal cross-sectional view showing the essential structure of the electronic apparatus, indicates a state where the hard cover is opened.
Figure 4:
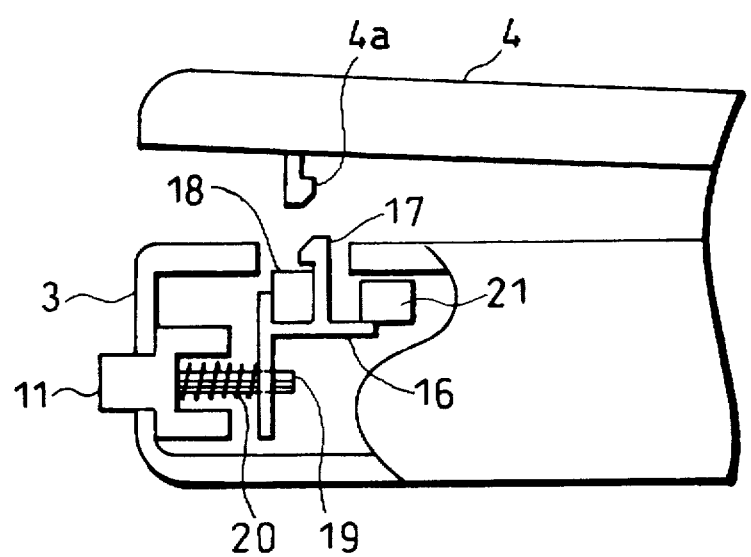
FIG. 4, which is a lateral cross-sectional view showing the essential structure of the electronic apparatus, indicates a state where the hard cover is opened.
Figure 5:
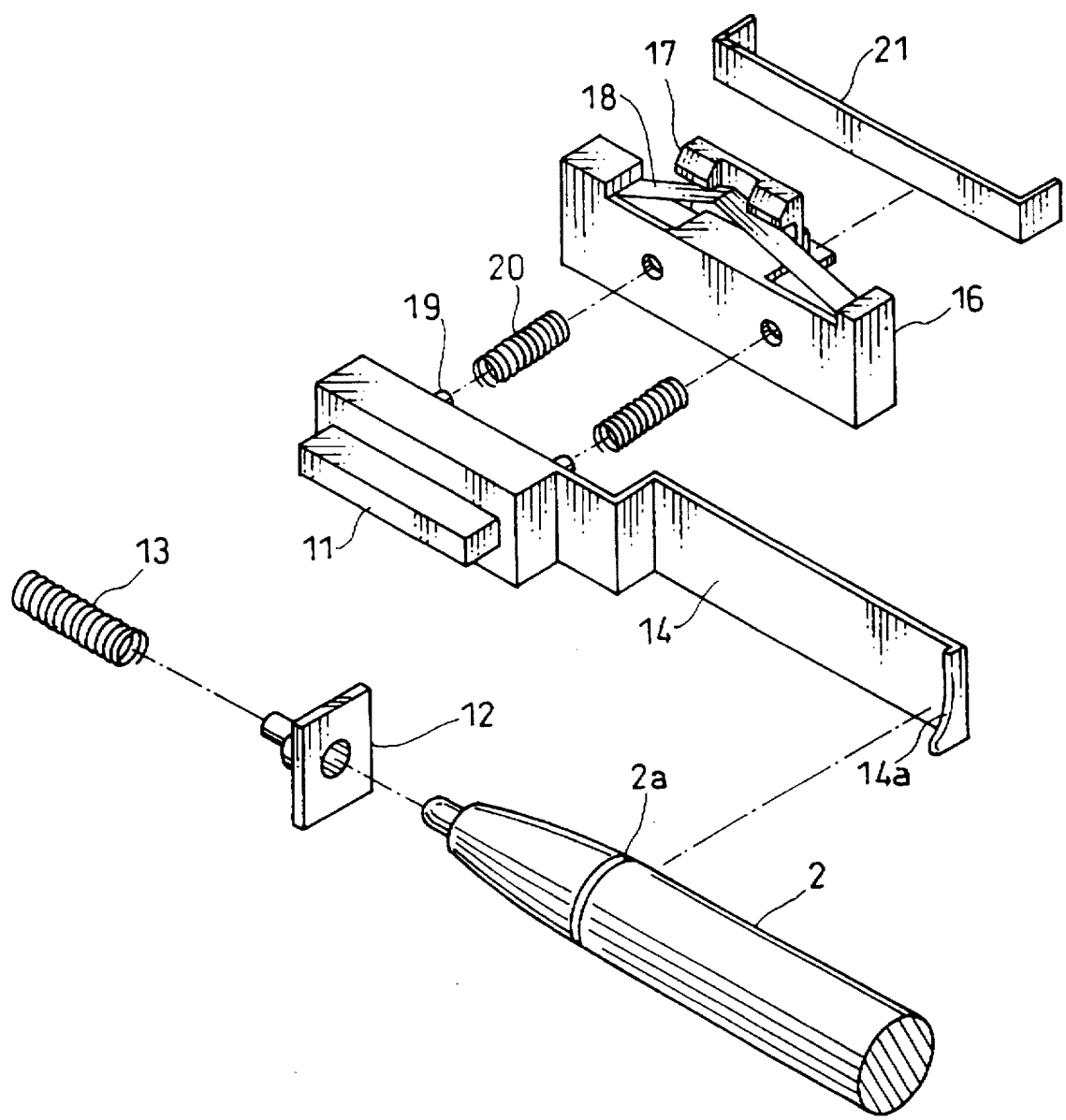
FIG. 5 is a perspective view that shows the essential structure of the electronic apparatus of Embodiment 1 in an exploded fashion.
Figure 18:
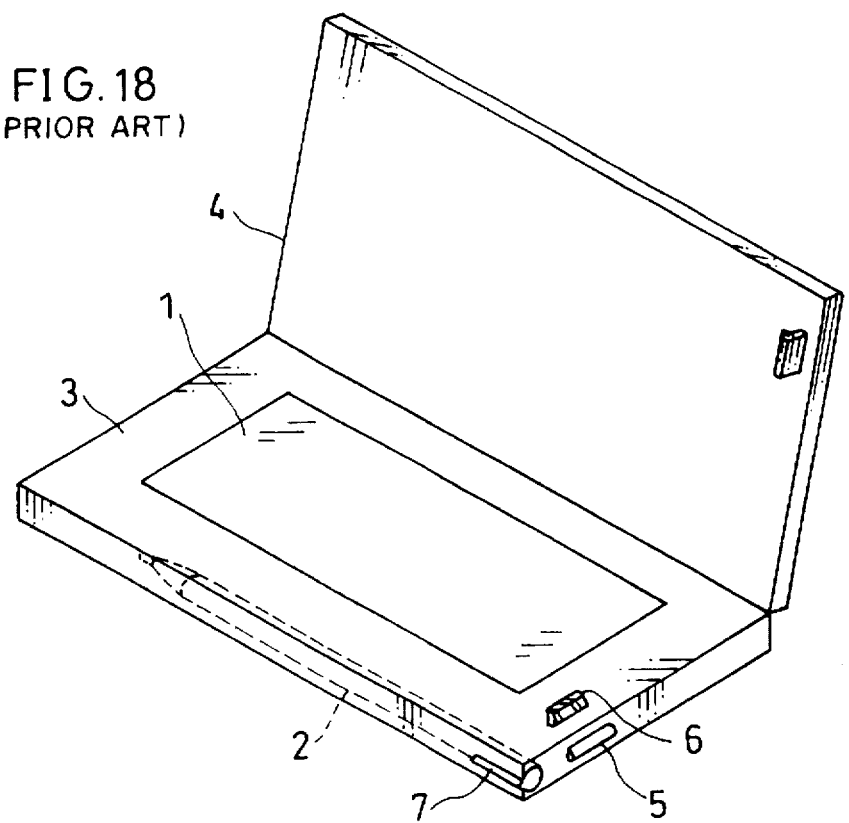
FIG. 18 is a perspective view showing an appearance of another conventional electronic apparatus.
Figure 19:
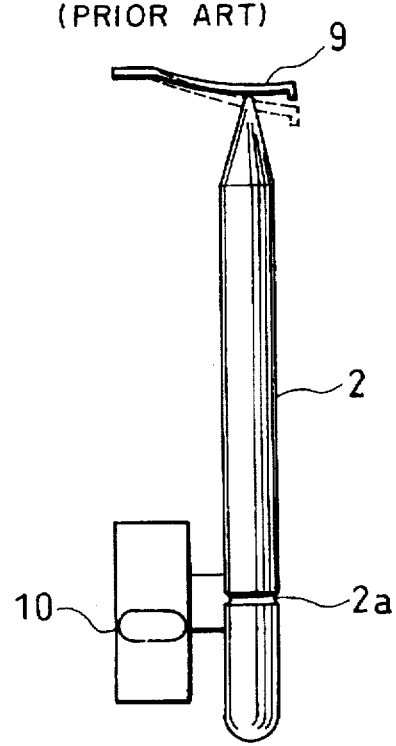
FIG. 19 is an explanatory view that schematically shows an essential structure of still another conventional electronic apparatus.

FIG. 1 is a perspective view showing an appearance of an electronic apparatus of the present embodiment, FIG. 2 is a cross-sectional view taken by a plane along line A—A of FIG. 1, FIG. 3 is a longitudinal cross-sectional view showing the essential structure of the electronic apparatus, FIG. 4 is a lateral cross-sectional view showing the essential structure of the electronic apparatus, and FIG. 5 is a perspective view that shows the essential structure of the electronic apparatus of the present embodiment in an exploded fashion. Here, only FIG. 2 shows a state where a hard cover is closed, and figures other than FIG. 2 show a state where the hard cover is opened. Additionally, in these figures, since the entire structure of the electronic apparatus is basically the same as that of the conventional apparatus, those members in FIGS. 1 through 5 that are the same as or similar to those of FIGS. 18 and 19 are indicated by the same reference numerals and their detailed explanations will be omitted. Further, specific constructions of components, such as a display section 1, an input pen 2 and an apparatus main body 3, have been described in U.S. Pat. No. 08/463,685.

As in the conventional apparatus, an electronic apparatus of the present embodiment is provided with an apparatus main body 3 having a rectangular plate shape in which an input pen 2 is housed and held, and a hard cover 4 that is attached to the apparatus main body 3 so as to be freely opened and closed in such a manner as to pivot where covering the surface of the apparatus main body 3. Further, a display section 1 to which hand-written data is inputted by using the input pen 2 is installed face to face with the hard cover 4. A lock button 11, which is pressed from outside toward inside, is installed on the side face opposite to the side having the hard cover 4 of the apparatus main body 3 in a fashion sticking out from the side face. Moreover, at predetermined positions inside the apparatus main body 3, a cap 12, which receives and supports the inside end (top portion) of the input pen 2 that has been inserted in a direction along the side face, that is, in a direction in parallel with the pivotal axis of the hard cover 4, and a coil spring (first pressing member) 13, which presses and urges the inside end of the input pen 2 outward through the cap 12, are installed. Here, the coil spring 13 is positioned and supported by a rib 3a that is installed inside the apparatus main body 3. The movement of the cap 12 that is to be pressed and urged by the coil spring 13 is limited by another rib 3b.

Furthermore, the base end portion of a pen holding member 14 is integrally connected to the inside end of the lock button 11 that is inserted into the apparatus main body 3. The pen holding member 14 is formed to have a bent shape so that it is extended from the lock button 11 where avoiding the rib 3a. Here, an engaging member 14a, which engages an engaging-use recess 2a that is formed on the side face in the lengthwise direction of the input pen 2, is formed at the top of the pen holding member 14.

In other words, the input pen 2, which has been housed inside the apparatus main body 3, is held in the apparatus main body 3 with the engaging-use recess 2a being engaged by the engaging member 14a of the pen holding member 14. Further, the pen holding member 14 is shifted inside the apparatus main body 3 following the movement of the lock button 11 that has been pressed, and the engaging member 14a is released from the engaging-use recess 2a following the shift. Thus, the input pen 2 is pushed out of the apparatus main body 3 by the action of the coin spring 13.

Moreover, a cover holding member 16 is installed inside the lock button 11 with a space 15 having a predetermined gap. A hook member 17, which functions as an engaging member, is installed on the cover holding member 16, and the hard cover 4 is closed by the engagement between the hook member 17 and a hook 4a that serves as an engagement member of the hard cover 4. A hop-up spring (third pressing member) 18, which is a plate spring that presses and urges the hook 4a of the hard cover 4 outward (upward) so as to open the hard cover 4, is installed on the cover holding member 16. Furthermore, positioning-use guide pins 19, which are extended from the inside-end face of the lock button 11 in parallel with each other, are inserted into the cover holding member 16 and held therein. These guide pins 19 have respective coil springs 20 that are externally attached thereto so as to push back the lock button 11 that has been pressed.

When the lock button 11 is pressed, the input pen 2 is pushed out of the apparatus main body 3. Here, if the lock button 11 is continuously pressed after the input pen 2 has been pushed out, the lock button 11 is shifted until there is no space 15 left in between. After the space 15 has been eliminated, the lock button 11 comes into contact with the cover holding member 16, thereby pressing the cover holding member 16. Thus, the cover holding member 16 is shifted along a side face of a rib 3c that is installed inside the apparatus main body 3. When the hook member 17 is moved following the shift of the cover holding member 16, the engagement between the hook 4a and the hook member 17 is released, and the hook 4a is pushed up by the hop-up spring 18. Consequently, the hard cover 4 is released. Here, a plate spring 21 is installed inside the apparatus main body 3 so as to push back the cover holding member 16. The plate spring 21, which is supported by a rib (not shown) inside the apparatus main body 3, is arranged so that, after the hard cover 4 has been released, the cover holding member 16 that has been pressed by the lock button 11 is pushed back to its initial position.

As described above, after the input pen 2 has been pushed out of the apparatus main body 3 by the pressing operation of the lock button 11, the hard cover 4 is allowed to open by continuously pressing the lock button 11. Therefore, it becomes possible to carry out a sequence of operations, that is, the opening operation of the hard cover 4 and the taking out operation of the input pen 2, by merely performing a single pressing operation of the lock button 11. Consequently, it is possible to improve usability, that is, convenience in use.

Moreover, in the electronic apparatus of the present embodiment, the space 15 is provided between the lock button 11 and the cover holding member 16. This arrangement eliminates the possibility of undesirable opening of the hard cover 4 even if the input pen 2 is housed into the apparatus main body 3 after the hard cover 4 has been closed, and also eliminates the possibility of undesirable push-out of the input pen 2 from the apparatus main body 3 when the hard cover 4 is closed after the input pen 2 has been housed.

[Embodiment 2]

Figure 6:
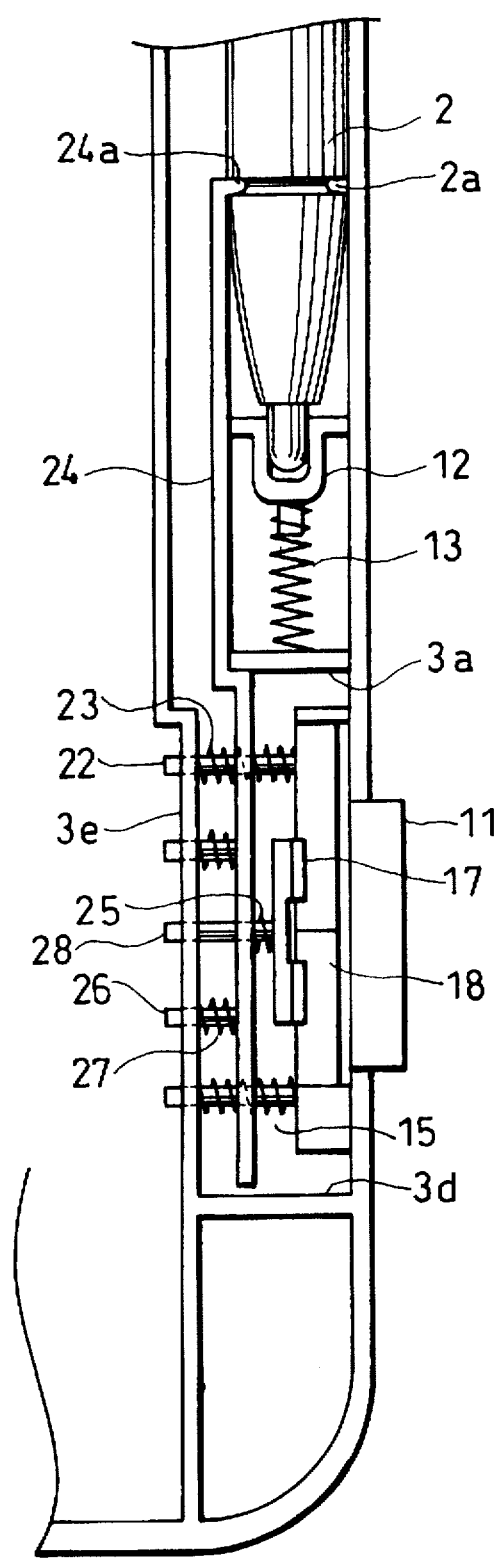
FIG. 6, which is a cross-sectional view taken by a plane along line A—A of FIG. 1, shows an essential structure of the electronic apparatus of Embodiment 2.
Figure 7:
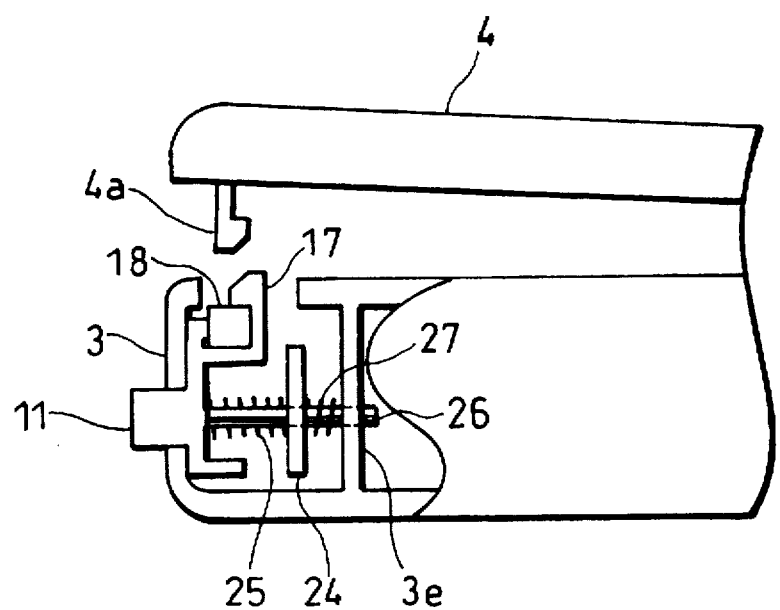
FIG. 7, which is a lateral cross-sectional view showing the essential structure of the electronic apparatus, indicates a state where the hard cover is opened.
Figure 8:
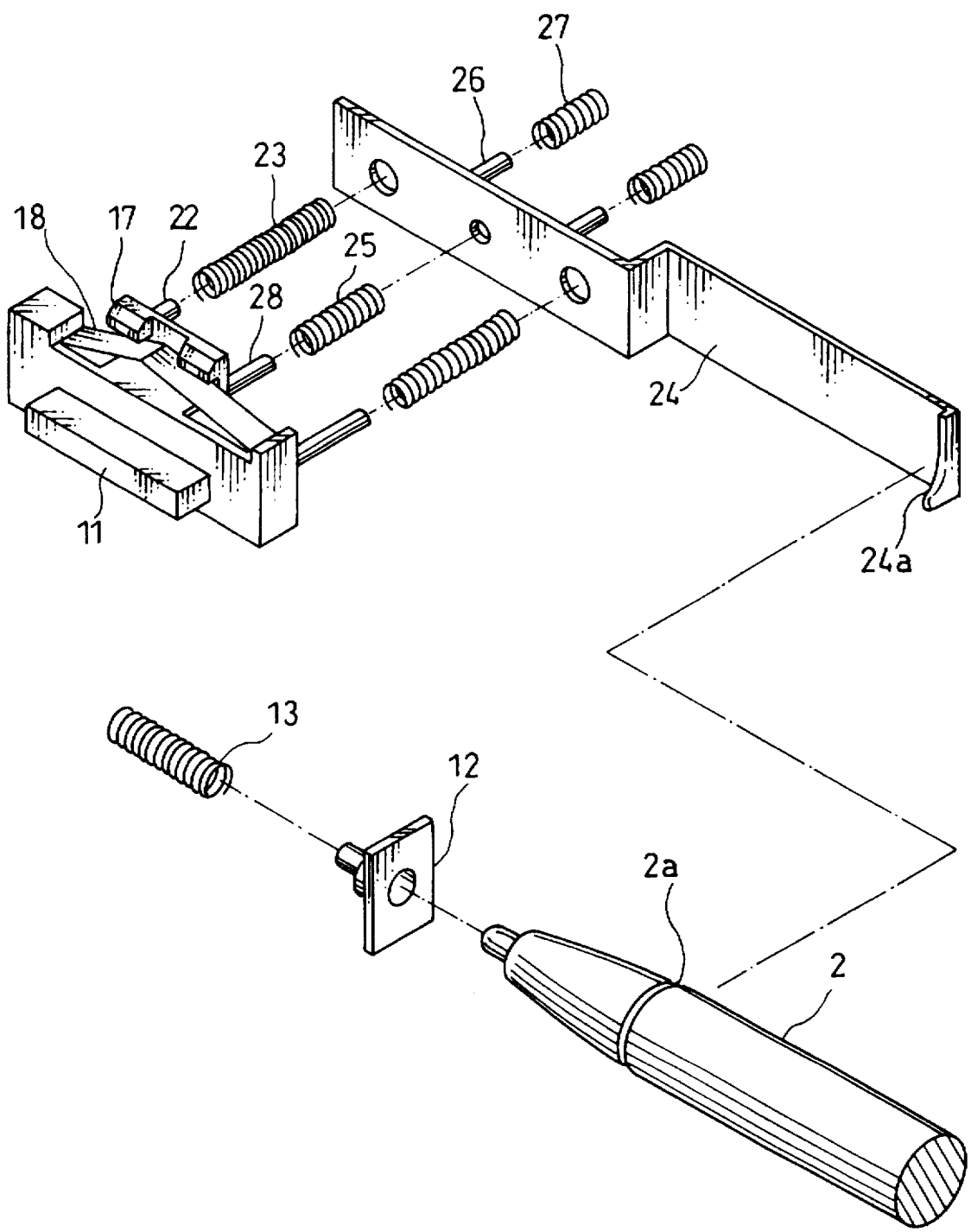
FIG. 8 is a perspective view that shows the essential structure of the electronic apparatus of Embodiment 2 in an exploded fashion.

FIG. 6, which is a cross-sectional view taken by a plane along line A—A of FIG. 1, shows an essential structure of the electronic apparatus of the present embodiment; FIG. 7 is a lateral cross-sectional view thereof; and FIG. 8 is a perspective view that shows the essential structure of the electronic apparatus of the present embodiment in an exploded fashion. Additionally, in these figures, since the entire structure of the electronic apparatus is basically the same as that of Embodiment 1 illustrated in FIG. 1, its explanation will be omitted, and those members in FIGS. 6 through 8 that are the same as or similar to those of FIGS. 1 through 5 are indicated by the same reference numerals.

A lock button 11, which is pressed from outside toward inside, is installed on one side of the apparatus main body 3 that is one component of the electronic apparatus of the present embodiment. Moreover, inside the apparatus main body 3, a cap 12, which receives and supports the inside end (top portion) of the input pen 2 that has been housed, and a coil spring (first pressing member) 13, which presses and urges the inside end of the input pen 2 outward through the cap 12, are installed. On the inside end face of the lock button 11 that is inserted inside the apparatus main body 3, a hook member 17, which serves as an engaging member for closing the hard cover 4 through the engagement with the hook 4a that is attached to the hard cover 4, and a hop-up spring (third pressing member) 18, which presses and urges the hook 4a of the hard cover 4 upward so as to open the hard cover 4, are installed.

In this arrangement, the lock button 11, when pressed, is shifted inward along the rib 3d inside the apparatus main body 3. Then, since the hook member 17 is shifted by the lock button 11, the engagement of the hook member 17 to the hook 4a of the hard cover 4 is released. When the engagement has been released, the hop-up spring 18, attached to the lock button 11, presses the hook 4a outward (upward). Thus, the hard cover 4 is released from the apparatus main body 3. Here, positioning-use guide pins 22 are extended from the inside end face of the lock button 11 in parallel with each other, and connected to a rib 3e inside the apparatus main body 3 through a pen holding member 24, which will be described later. Further, a coil spring 23 is externally attached to the guide pins 22 so as to push back the lock button 11.

The pen holding member 24, which has a plate shape, is placed inside the lock button 11 with a space 15 having a predetermined gap to the lock button 11. Here, the pen holding member 24 is provided in a bent fashion so as to avoid the rib 3a. An engaging member 24a, which engages an engaging-use recess 2a formed in the input pen 2, is provided at the top of the pen holding member 24. In other words, when the input pen 2 is housed inside the apparatus main body 3, it is maintained in the apparatus main body 3 with the engaging-use recess 2a being engaged by the engaging member 24a of the pen holding member 24. Here, a guide pin 28, to which a coil spring 25 is externally attached, is attached to the lock button 11 so as to connect the lock button 11 and the pen holding member 24. Moreover, positioning-use guide pins 26 are attached to the pen holding member 24, and a coil spring 27 is externally attached to the guide pins 26 so as to push back the pen holding member 24 to its original position. The coil spring 25 and the coil spring 27 are designed to keep the same load balance.

Here, if the lock button 11 is continuously pressed after the hard cover 4 has been released, the lock button 11 is shifted until there is no space 15 left in between, and allowed to contact the pen holding member 24 so as to press and shift the pen holding member 24. When the engaging member 24a of the pen holding member 24 that has been shifted is disengaged from the engaging-use recess 2a of the input pen 2, the engagement of the pen holding member 24 to the input pen 2 is released. Thus, the input pen 2 is pushed out of the apparatus main body 3 by the action of the coil spring 13.

In other words, in the arrangement of Embodiment 1, the hard cover 4 is opened after the input pen 2 has first been pushed out, where in the arrangement of Embodiment 2, after the hard cover 4 has been opened, the input pen 2 is pushed out of the apparatus main body 3. Therefore, it becomes possible to carry out a sequence of operations, that is, the opening operation of the hard cover 4 and the taking-out operation of the input pen 2, by merely performing a single pressing operation of the lock button 11. Consequently, it is possible to improve usability, that is, convenience in use.

Moreover, in the electronic apparatus of the present embodiment, it is possible to open only the hard cover 4 with the input pen 2 remaining in the housed state, by stopping the lock button 11 halfway in its pressing operation. Thus, it becomes possible to use the key board 8 with the input pen 2 being housed, and consequently to improve usability upon using only the key board 8 that is installed on the surface of the apparatus main body 3.

Furthermore, in the electronic apparatus of the present embodiment, the space 15 is provided between the lock button 11 and the pen holding member 24, and the coil spring 23 for pushing back the lock button 11 is also provided in a manner so as not to interfere with the pen holding member 24. Thus, even after the hard cover 4 has been opened, the input pen 2 is not pushed out until the lock button 11 has shifted the pen holding member 24. Here, since the coil spring 25 and the coil spring 27 are designed to keep the same load balance, the lock button 11 is not shifted even if the input pen 2 is housed after the hard cover 4 has been closed.

[Embodiment 3]

Figure 9:
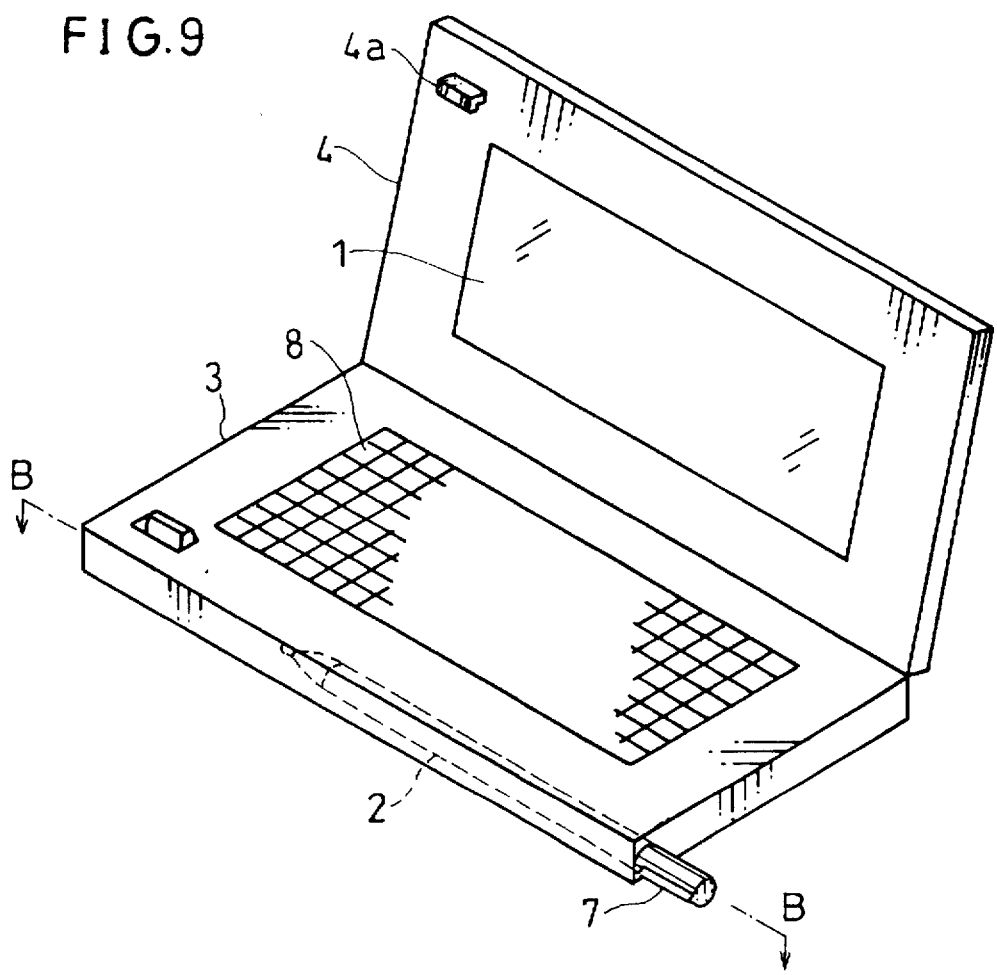
FIG. 9 is a perspective view showing an appearance of an electronic apparatus of Embodiment 3 and Embodiment 4.
Figure 10:
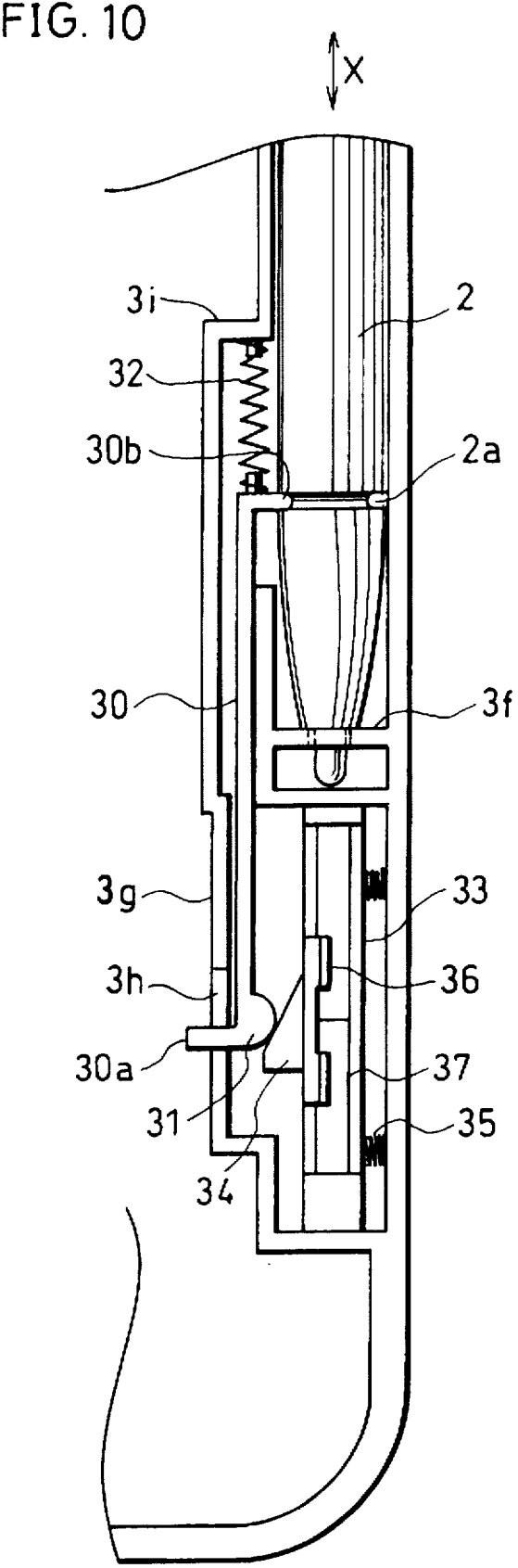
FIG. 10, which is a cross-sectional view taken by a plane along line B—B of FIG. 9, shows an essential structure of the electronic apparatus of Embodiment 3 in which an input pen is held.
Figure 11:
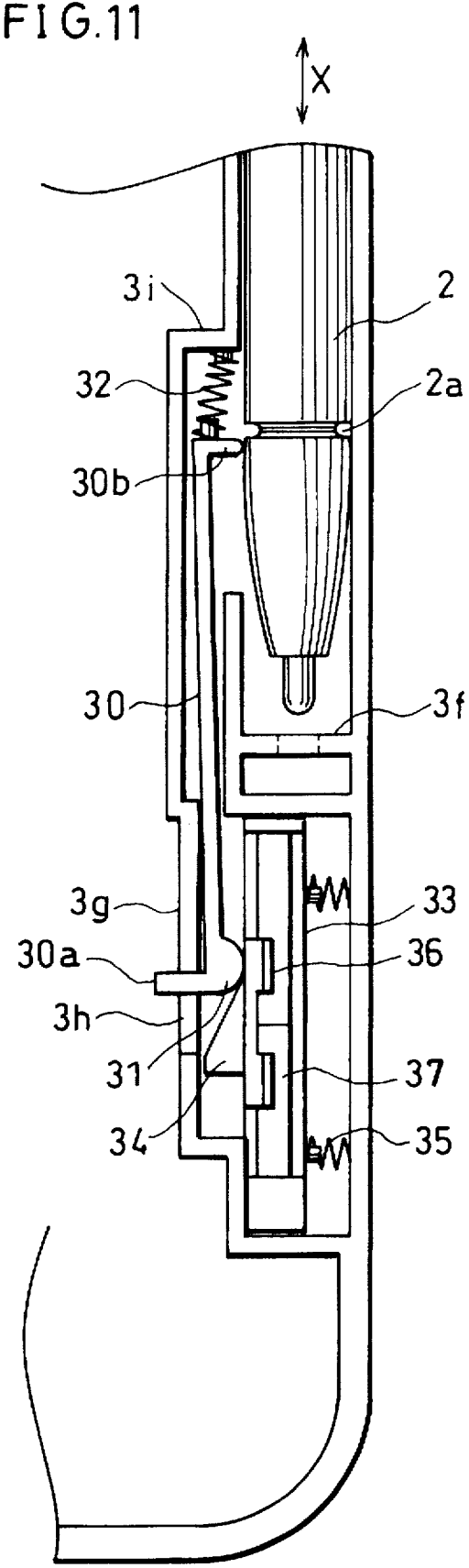
FIG. 11, which is a cross-sectional view taken by a plane along line B—B of FIG. 9, shows an essential structure of the electronic apparatus of Embodiment 3 in which the input pen is being drawn.
Figure 12:
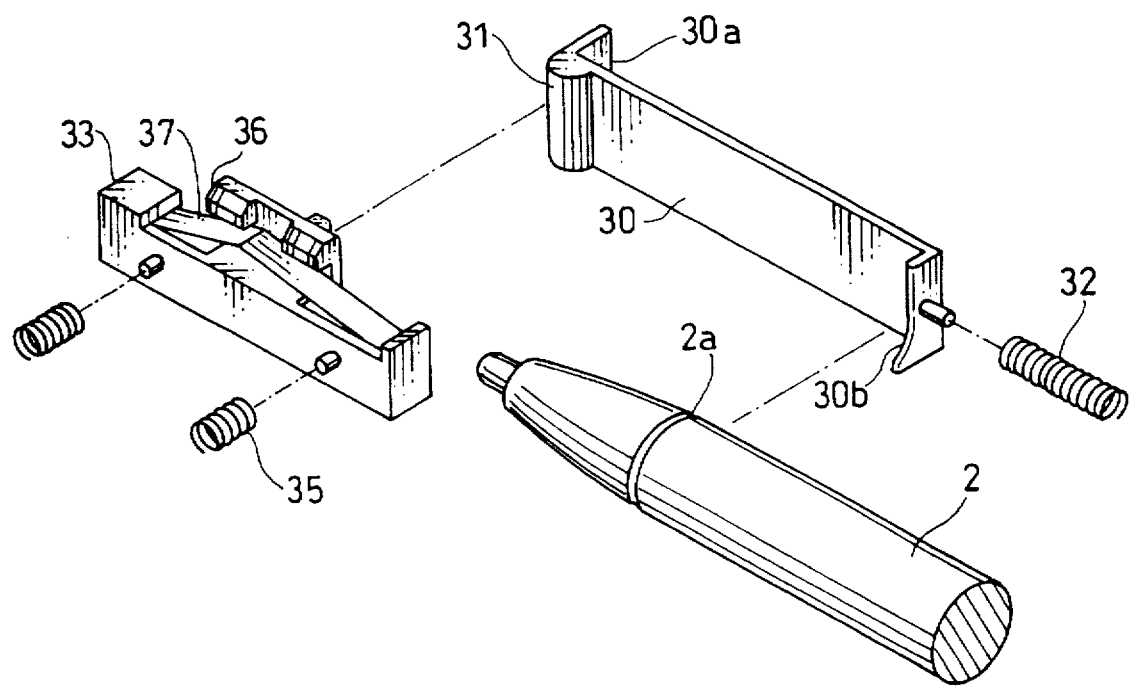
FIG. 12 is a perspective view that shows the essential structure of the electronic apparatus of Embodiment 3 in an exploded fashion.

FIG. 9 is a perspective view showing an appearance of an electronic apparatus of the present embodiment; FIGS. 10 and 11, which are cross-sectional views taken by a plane along line B—B of FIG. 9, show essential structures of the electronic apparatus; and FIG. 12 is a perspective view that shows the essential structure of the electronic apparatus in an exploded fashion. FIG. 10 shows a state in which an input pen is held, and FIG. 11 shows a state in which the input pen is being drawn. Here, those members in FIGS. 9 through 12 that are the same as or similar to those of FIGS. 1 through 5 are indicated by the same reference numerals, and the detailed description thereof is omitted.

The electronic apparatus of the present embodiment is provided with an apparatus main body 3 in which an input pen 2 is housed and held, and a hard cover 4 that is attached to the apparatus main body 3 so as to be freely opened and closed in such a manner as to pivot where covering the surface of the apparatus main body 3. The inside end of the input pen 2 thus housed is received and supported by a rib 3f that is installed inside the apparatus main body 3. Further, a pen holding member 30, which has a plate shape, is placed inside the apparatus main body 3 in parallel with directions X in which the input pen 2 are inserted and removed. A sliding member 30a, which slides along a guide groove (shift-restricting member) 3h formed in the rib 3g inside the apparatus main body 3, and a protrusion 31, which sticks out in the reverse direction to the sliding member 30a, are formed in one end of the pen holding member 30. Moreover, an engaging member 30b, which engages an engaging-use recess 2a of the input pen 2, is formed in the other end of the pen holding member 30. A coil spring 32 (fourth pressing member), which presses the sliding member 30a of the pen holding member 30 so as to bring it to the farthest end of the guide groove 3h, is interpolated between the engaging member 30b and the rib 3i.

In other words, when the input pen 2 is housed, the pen holding member 30 is positioned by the coil spring 32 so that the sliding member 30a is brought to the farthest end of the guide groove 3h. Then, the engaging-use recess 2a of the input pen 2 is engaged by the engaging member 30b of the pen holding member 30, and thus positioned and maintained. That is, the pen holding member 30 of the present embodiment, which is allowed to shift along directions X in which the input pen 2 is inserted and removed, holds the input pen 2 by engaging the engaging-use recess 2a.

Moreover, a cover holding member 33, which shifts along the direction that is orthogonal to the inserting and removing directions X of the input pen 2 following the movement of the pen holding member 30, is installed inside the apparatus main body 3. A tilting member 34 is attached to the cover holding member 33 so as to face the pen holding member 30, and the tilting member 34 is designed to slide on the protrusion 31. Further, a pair of coil springs (second pressing members) 35, which press and urge the tilting member 34 toward the pen holding member 30 in the direction that is orthogonal to the inserting and removing directions X of the input pen 2, are attached to the cover holding members 33, and these coil springs 35 are supported by an inner surface of the apparatus main body 3.

Furthermore, on the cover holding member 33 are installed a hook member 36 that functions as an engaging member for closing the hard cover 4 by engaging a hook 4a that is an engagement member of the hard cover 4, as well as a hop-up spring (third pressing member) 37 for pressing the hook 4a of the hard cover 4 outward so as to open the hard cover 4. As illustrated in FIG. 10, in a state wherein the input pen 2 is held, the engaging-use recess 2a of the housed input pen 2 is engaged by the engaging member 30b of the pen holding member 30, and the tilting member 34 is kept in contact with the protrusion 31 of the pen holding member 30. Thus, the cover holding member 33 has been shifted close to the inner surface of the apparatus main body 3, and the hard cover 4 is closed with the hook member 36 engaging the hook 4a.

Therefore, in the present embodiment, when the input pen 2 is drawn from the apparatus main body 3, the pen holding member 30, whose engaging member 30b has engaged the engaging-use recess 2a, is shifted along directions X in which the input pen 2 are inserted and removed, and the protrusion 31 is subsequently shifted following the pen holding member 30. Thus, where the tilting member 34 slides over the protrusion 31, the cover holding member 33, which has been pressed and urged by the coil spring 35, is allowed to shift inwardly to the apparatus main body 3 in the direction orthogonal to directions X in which the input pen 2 are inserted and removed. At this time, the hook member 36 shifts following the cover holding member 33, and this movement releases the engagement of the hook member 36 to the hook 4a of the hard cover 4 so that the hard cover 4 is allowed to open by the action of the hop-up spring 37 that is installed on the cover holding member 33. Moreover, the sliding member 30a has reached the nearest end of the guide groove 3h following the movement of the pen holding member 30, the movement of the pen holding member 30 is blocked so that the pen holding member 30 is distorted and, as shown in FIG. 11, the engaging member 30b of the pen holding member 30 is disengaged from the engaging-use recess 2a of the input pen 2. Consequently, the input pen 2 is easily drawn out of the apparatus main body 3.

As described above, in accordance with the electronic apparatus of the present embodiment, it becomes possible to carry out a sequence of operations, that is, the opening operation of the hard cover 4 and the taking-out operation of the input pen 2, by merely performing a single drawing operation of the input pen 2. Consequently, it is possible to improve the usability.

In addition, instead of operating the lock button 11 installed in the arrangements of Embodiment 1 and Embodiment 2, the input pen 2 itself is operated so as to open the hard cover 4; therefore, it is not necessary to attach the lock button 11 to the apparatus main body 3. Consequently, it becomes possible to simplify the appearance of the apparatus. The use of this arrangement makes it possible to eliminate the possibility that the hard cover 4 opens inside a bag or other articles by an accidental pressing action onto the lock button 11.

Moreover, in the present embodiment, when the input pen 2 has been drawn out of the apparatus main body 3, the pen holding member 30 is pushed back to its initial position by the action of the coil spring 32 so that the hook 4a of the hard cover 4 is engaged by the hook member 36 on the cover holding member 33. Thus, whether the input pen 2 is housed or not, it is possible to close the hard cover 4. Furthermore, even if the input pen 2 is housed into the apparatus main body 3 with the hard cover 4 closed, the engagement between the hook 4a and the hook member 36 is not released although the pen holding member 30 is distorted. Thus, there is no possibility that the hard cover 4 may open at this time.

[Embodiment 4]

Figure 13:
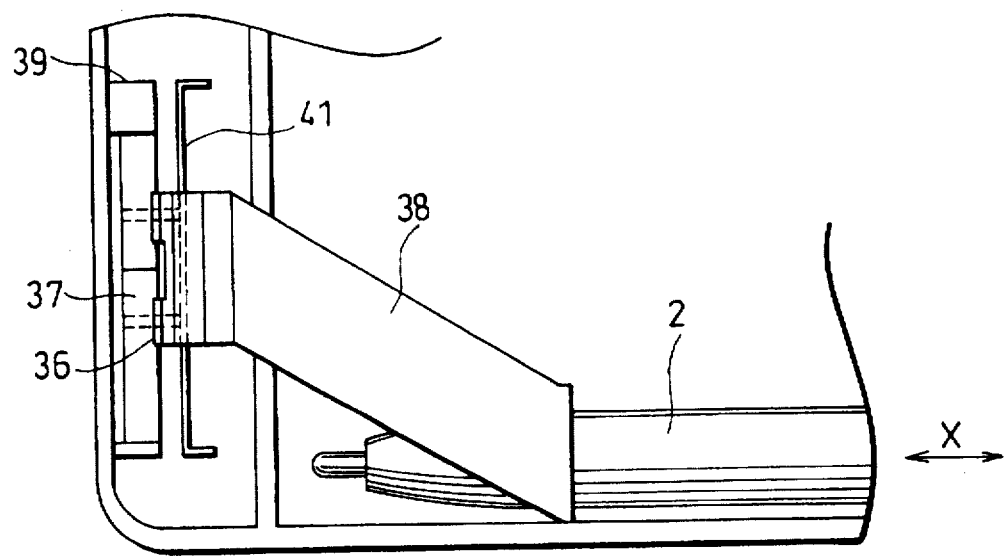
FIG. 13, which is a cross-sectional view taken by a plane along line B—B of FIG. 9, shows an essential structure of the electronic apparatus of Embodiment 4.
Figure 14:
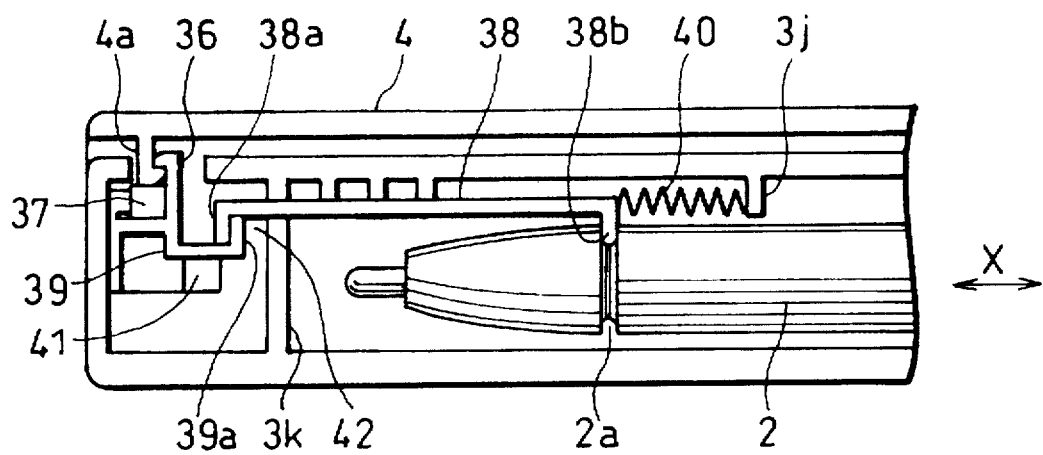
FIG. 14, which is a longitudinal cross-sectional view of the essential structure of the electronic apparatus, indicates a state where the input pen is held.
Figure 15:
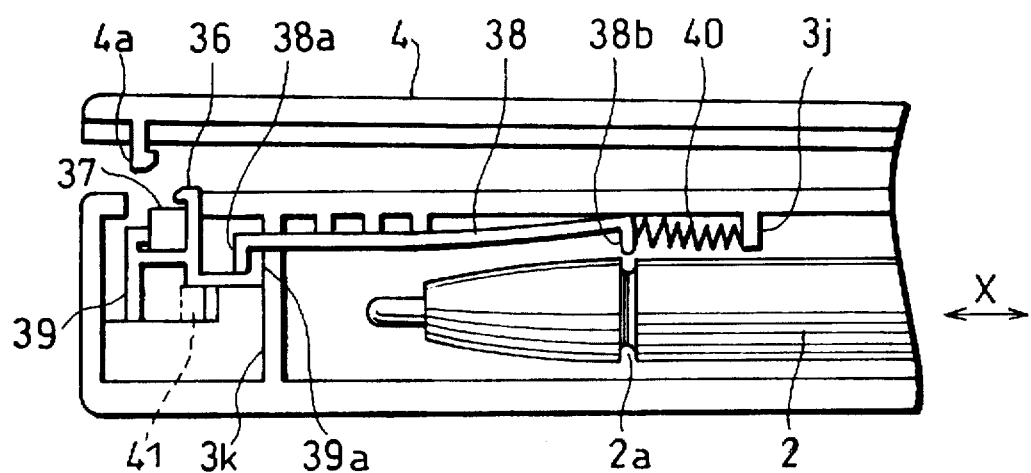
FIG. 15, which is a lateral cross-sectional view of the essential structure of the electronic apparatus, indicates a state where the input pen is being drawn.
Figure 16:
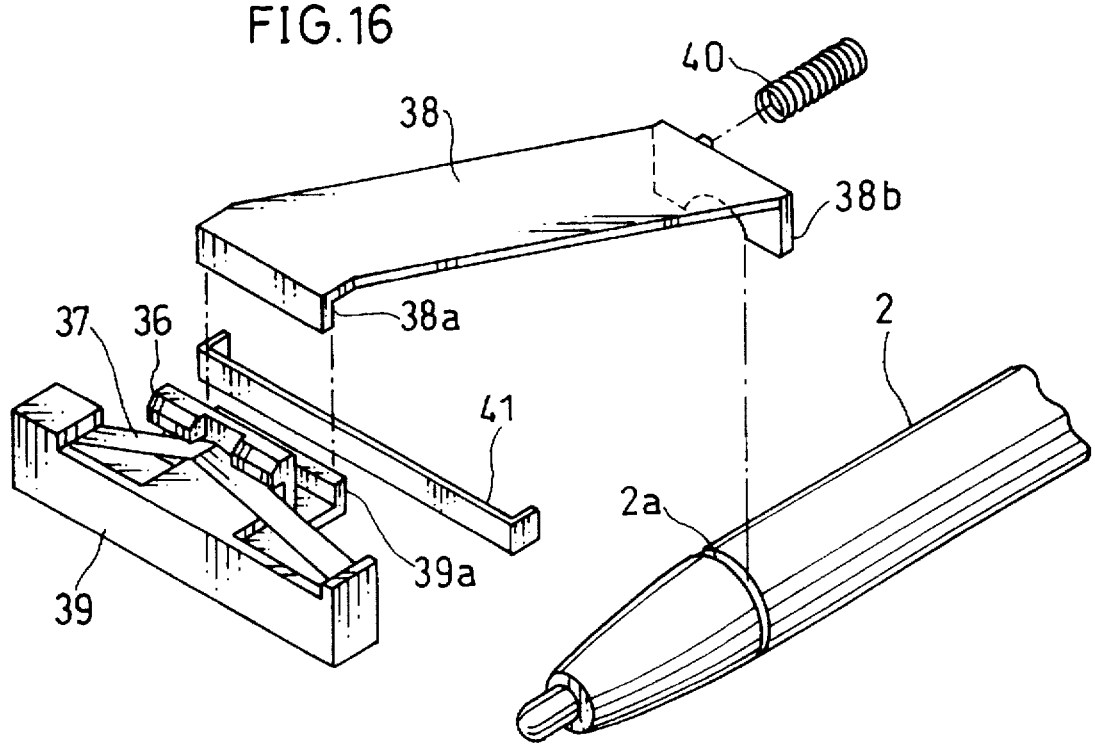
FIG. 16 is a perspective view that shows the essential structure of the electronic apparatus of Embodiment 4 in an exploded fashion.
Figure 17:
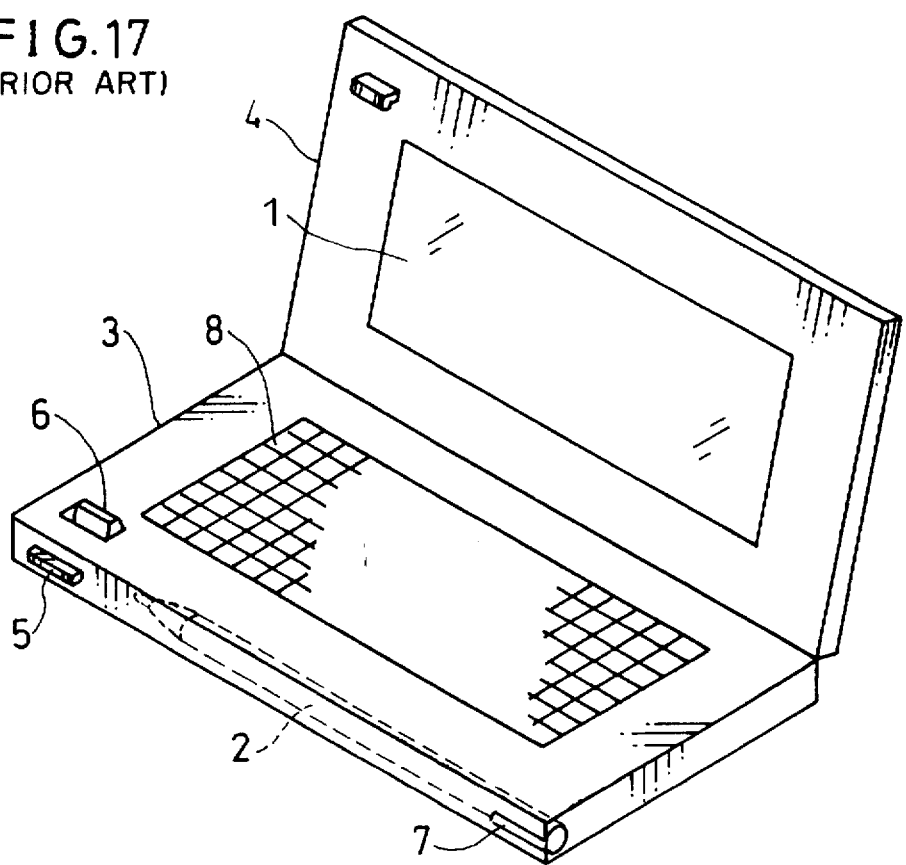
FIG. 17 is a perspective view showing an appearance of a conventional electronic apparatus.

FIG. 13, which is a cross-sectional view taken by a plane along line B—B of FIG. 9, shows an essential structure of an electronic apparatus of the present embodiment; FIGS. 14 and 15 are longitudinal cross-sectional views thereof; and FIG. 16 is a perspective view that shows the essential structure of the electronic apparatus in an exploded fashion. FIG. 14 shows a state in which an input pen is held, and FIG. 15 shows a state in which the input pen is being drawn. Here, since the present embodiment shows a modified example of the arrangement of Embodiment 3 and since the entire structure of the electronic apparatus is the same as that described in Embodiment 3 by reference to FIG. 9, its detailed explanation is omitted, and those members in FIGS. 14 through 16 that are the same as or similar to those of FIGS. 1 through 5 are indicated by the same reference numerals.

A pen holding member 38, which shifts along the inserting and removing directions X of the input pen 2 and also engages the input pen 2, is installed inside an apparatus main body 3 that constitutes the electronic apparatus of the present embodiment. An engaging member 38a, which engages a cover holding member 39 that will be described later, is formed on one end of the pen holding member 38, and an engaging member 38b, which engages an engaging-use recess 2a of the input pen 2, is formed on the other end thereof. Further, a coil spring 40, which presses and urges the pen holding member 38 in the inserting direction (toward the inner side) of the input pen 2 of the apparatus main body 3, is interpolated between the engaging member 38b and a rib 3j inside the apparatus main body 3. Moreover, the cover holding member 39 is placed on the inner side of the pen holding member 38. Here, the engaging member 38a of the pen holding member 38 is designed so that it engages an engaging member 39a that is formed on one end of the cover holding member 39, and so that it also slides on the cover holding member 39 within a predetermined range of distance.

Furthermore, on the cover holding member 39 are installed a hook member 36 that functions as an engaging member for closing the hard cover 4 by engaging a hook 4a of the hard cover 4, as well as a hop-up spring (third pressing member) 37 for pressing the hook 4a of the hard cover 4 outwardly (upward) so as to open the hard cover 4. As illustrated in FIG. 14, in a state wherein the input pen 2 is held, the cover holding member 39 is pressed by the action of a plate spring 41 that is positioned and supported by a rib (not shown) inside the apparatus main body 3 so that it is allowed to contact the inner surface of the apparatus main body 3. In this case, a space 42 having a predetermined gap is provided between the engaging member 39a and a rib 3k that is installed inside the apparatus main body 3. Here, the hard cover 4 is closed with its hook 4a being engaged by the hook member 36.

In the present embodiment, when the input pen 2 is drawn from the apparatus main body 3, the pen holding member 38, whose engaging member 38b has engaged the engaging-use recess 2a, is shifted along directions X in which the input pen 2 are inserted and removed. Thus, the cover holding member 39 is shifted following the pen holding member 38, and the hook member 36 is also shifted following the cover holding member 39. Consequently, since the engagement of the hook member 36 to the hook 4a is released, the hard cover 4 is allowed to open by the action of the hop-up spring 37. When the engaging member 39a of the cover holding member 39 has been shifted until there is no space 42 left to come into contact with the rib (shift-restricting member) 3k inside the apparatus main body 3, the movement of the pen holding member 38, which has followed the drawing action of the input pen 2, is blocked. This allows the pen holding member 38 itself to be distorted slightly, thereby making the engaging member 38b disengaged from the engaging-use recess 2a, as illustrated in FIG. 15. Consequently, the input pen 2 is easily drawn out of the apparatus main body 3.

As described above, in accordance with the electronic apparatus of the present embodiment, it becomes possible to carry out a sequence of operations, that is, the opening operation of the hard cover 4 and the taking-out operation of the input pen 2, by merely performing a single drawing operation of the input pen 2. Consequently, it is possible to improve the usability. In addition, since it is not necessary to attach the lock button 11 to the apparatus main body 3, it becomes possible to simplify the appearance of the apparatus. Further, the use of this arrangement makes it possible to eliminate the possibility that the hard cover 4 may open inside a bag or other articles by an accidental pressing action onto the lock button 11.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An electronic apparatus with an input pen to which hand-written data is inputted by using the input pen, comprising:

an apparatus main body for housing and supporting the input pen; and
a hard cover that is attached to the apparatus main body in a covering manner so as to be freely opened and closed,
wherein the apparatus main body comprises:
a lock button that is pressed from outside toward inside;
a pen-holding member that engages the input pen that has been housed and that releases the engagement of the input pen when the lock button is shifted;
a first pressing member for pressing the input pen at an inside end thereof so as to urge it outward;
an engaging member for engaging the hard cover that has been closed; and
a cover holding member for releasing the engagement when the lock button is shifted.

2. The electronic apparatus with an input pen as defined in claim 1, wherein the pen holding member is connected to the lock button and wherein the cover holding member is placed with a space to the inside end face of the lock button, the cover holding member being pressed by the lock button that has been shifted until there is no space left in between.

3. The electronic apparatus with an input pen as defined in claim 1, wherein the cover holding member is connected to the lock button and wherein the pen holding member is placed with a space to the inside end face of the lock button, the pen holding member being pressed by the lock button that has been shifted until there is no space left in between.

4. The electronic apparatus with an input pen as defined in claim 1, wherein the apparatus main body houses the input pen so as to be freely inserted and removed in the lengthwise direction thereof.

5. The electronic apparatus with an input pen as defined in claim 1, wherein the hard cover is freely opened and closed by pivotal movements thereof, and wherein the apparatus main body houses the input pen in a manner in which inserting and removing directions of the input pen are parallel to the pivotal axis of the hard cover.

6. The electronic apparatus with an input pen as defined in claim 4, further comprising a cap for supporting the input pen by receiving the inside end of the input pen, the cap being placed between the pressing member and the inside end of the input pen.

7. The electronic apparatus with an input pen as defined in claim 1, wherein the pen holding member includes an engaging member that engages an engaging-use recess that is provided in a side face of the input pen.

8. The electronic apparatus with an input pen as defined in claim 1, wherein the apparatus main body further comprises a key board.

9. The electronic apparatus with an input pen as defined in claim 1, further comprising a display section having a pressure-sensitive construction to which hand-written data is inputted by pressing operations made by the input pen.

10. The electronic apparatus with an input pen as defined in claim 1, further comprising a third pressing member for pressing and urging the hard cover outward.

11. An electronic apparatus with an input pen to which hand-written data is inputted by using the input pen, comprising:

an apparatus main body which houses an input pen in a freely attachable and removable manner; and
a hard cover which is attached to the apparatus main body in a covering manner so as to be freely opened and closed,
wherein the apparatus main body comprises:
a pen holding member that is shifted where engaging the housed input pen, and that releases the engagement when the input pen is drawn to a predetermined position;
an engaging member for engaging the hard cover that has been closed; and
a cover holding member that releases the engagement when the pen holding member is shifted.

12. The electronic apparatus with an input pen as defined in claim 11, further comprising:

a tilting member that is placed face to face with the pen holding member; and
a second pressing member for pressing and urging the cover holding member onto the pen holding member,
wherein the tilting member is arranged so that the cover holding member is shifted in a direction orthogonal to the inserting and removing directions of the input pen when the pen holding member is shifted.

13. The electronic apparatus as defined in claim 11, wherein the cover holding member is shifted in the inserting and removing directions of the input pen where engaging the pen holding member.

14. The electronic apparatus with an input pen as defined in claim 11, wherein the apparatus main body houses the input pen so as to be freely inserted and removed in the lengthwise direction thereof.

15. The electronic apparatus with an input pen as defined in claim 11, wherein the hard cover is freely opened and closed by pivotal movements thereof, and wherein the apparatus main body houses the input pen in a manner in which inserting and removing directions of the input pen are parallel to the pivotal axis of the hard cover.

16. The electronic apparatus with an input pen as defined in claim 11, wherein the apparatus main body includes a shift-restricting section that restricts the movement of the pen holding member in the drawing direction thereof.

17. The electronic apparatus with an input pen as defined in claim 11, wherein the pen holding member includes an engaging member that engages an engaging-use recess that is provided in a side face of the input pen.

18. The electronic apparatus with an input pen as defined in claim 11, wherein the apparatus main body further comprises a key board.

19. The electronic apparatus with an input pen as defined in claim 11, further comprising a display section having a pressure-sensitive construction to which hand-written data is inputted by pressing operations made by the input pen.

20. The electronic apparatus with an input pen as defined in claim 11, further comprising a third pressing member for pressing and urging the hard cover outward.

21. The electronic apparatus with an input pen as defined in claim 11, further comprising a fourth pressing member for pressing and urging the pen holding member to an initial position thereof after the input pen has been drawn out.

* * * * *